(12) United States Patent
Bang et al.

(10) Patent No.: US 12,539,051 B2
(45) Date of Patent: Feb. 3, 2026

(54) METHOD AND ANALYSIS DEVICE FOR COLLATERAL CIRCULATION ASSESSMENT BASED ON DEEP LEARNING MODEL USING DYNAMIC PERFUSION MRI IMAGE

(71) Applicant: SAMSUNG LIFE PUBLIC WELFARE FOUNDATION, Seoul (KR)

(72) Inventors: Oh Young Bang, Seoul (KR); Yoon Chul Kim, Seoul (KR); Jong Won Chung, Seoul (KR); Woo Keun Seo, Seoul (KR); Gyeong Moon Kim, Seoul (KR)

(73) Assignee: SAMSUNG LIFE PUBLIC WELFARE FOUNDATION, Seoul (KR)

( * ) Notice: Subject to any disclaimer, the term of this patent is extended or adjusted under 35 U.S.C. 154(b) by 89 days.

(21) Appl. No.: 18/707,414

(22) PCT Filed: Oct. 14, 2022

(86) PCT No.: PCT/KR2022/015553
§ 371 (c)(1),
(2) Date: May 3, 2024

(87) PCT Pub. No.: WO2023/080477
PCT Pub. Date: May 11, 2023

(65) Prior Publication Data
US 2025/0040822 A1    Feb. 6, 2025

(30) Foreign Application Priority Data
Nov. 3, 2021  (KR) .................... 10-2021-0149615

(51) Int. Cl.
*A61B 5/026*  (2006.01)
*A61B 5/00*  (2006.01)
*A61B 5/055*  (2006.01)

(52) U.S. Cl.
CPC .......... *A61B 5/0263* (2013.01); *A61B 5/0042* (2013.01); *A61B 5/055* (2013.01); *A61B 5/7264* (2013.01); *A61B 2576/026* (2013.01)

(58) Field of Classification Search
CPC ..... A61B 5/0263; A61B 5/0042; A61B 5/055; A61B 5/7264; A61B 2576/026
See application file for complete search history.

(56) References Cited

U.S. PATENT DOCUMENTS

2007/0167731 A1  7/2007  Taxt et al.
2013/0085379 A1*  4/2013  Feinberg .............. G01R 33/543
600/419

(Continued)

FOREIGN PATENT DOCUMENTS

KR    10-2014-0142652 A    12/2014
KR       10-2001790 B1     7/2019
(Continued)

OTHER PUBLICATIONS

International Search Report for PCT/KR2022/015553 mailed Feb. 8, 2023 from Korean Intellectual Property Office.
(Continued)

*Primary Examiner* — Sean A Frith
(74) *Attorney, Agent, or Firm* — Paratus Law Group, PLLC

(57) ABSTRACT

A method for collateral circulation assessment, using dynamic MRI images, includes the steps of: receiving dynamic perfusion MRI images of a subject by an analysis device; extracting arterial phase images, capillary phase images, and venous phase images from the dynamic perfu-
(Continued)

sion MRI images by the analysis device; inputting the arterial phase images, capillary phase images, and venous phase images into pre-trained, deep learning models, respectively, to calculate a plurality of collateral circulation prediction probability values by the analysis device; and conducting a final collateral circulation assessment for the subject, using the plurality of collateral circulation prediction probability values by the analysis device.

6 Claims, 7 Drawing Sheets

(56) References Cited

U.S. PATENT DOCUMENTS

| | | | | |
|---|---|---|---|---|
| 2016/0125597 | A1* | 5/2016 | Bang | G06T 5/50 600/419 |
| 2017/0249439 | A1* | 8/2017 | Taylor | G16H 30/40 |
| 2021/0236080 | A1* | 8/2021 | Herrmann | G16H 50/70 |
| 2022/0240880 | A1* | 8/2022 | Kim | G16H 50/20 |

FOREIGN PATENT DOCUMENTS

| KR | 10-2020-0113336 A | 10/2020 |
|---|---|---|
| WO | WO 2010/058014 A1 | 5/2010 |

OTHER PUBLICATIONS

Korean Notice of Allowance for related KR Application No. 10-2021-0149615 mailed Dec. 8, 2023 from Korean Intellectual Property Office.

Giles Tetteh et al., "A Deep Learning Approach to Predicting Collateral Flow in Stroke Patients Using Radiomic Features from Perfusion Images", arXiv:2110.12508v1 [cs.CV], Oct. 24, 2021, pp. 1-17.

Extended European Search Report for related EP Application No. 22890212.8 mailed Aug. 21, 2025 from European Patent Office.

Yiming Xiao et al., "Towards Automatic Collateral Circulation Score Evaluation in Ischemic Stroke Using Image Decompositions and Support Vector Machines", CMMI/RAMBO/SWITCH 2017, LNCS 10555, 2017, pp. 158-167, DOI: 10.1007/978-3-319-67564-0_16.

Mumu Aktar et al., "A Radiomics-Based Machine Learning Approach to Assess Collateral Circulation in Ischemic Stroke on Non-contrast Computed Tomography", ML-CDS 2020/CLIP 2020, LNCS 12445, 2020, pp. 24-33, https://doi.org/10.1007/978-3-030-60946-7_3.

Jason Brownlee, "A Gentle Introduction to Ensemble Learning Algorithms", Machine Learning Mastery, Apr. 19, 2021, pp. 1-12, URL: https://web.archive.org/web/20210421161038/https://machinelearningmastery.com/tour-of-ensemble-learning-algorithms/.

Artittayapron Rojarath et al., "Improved Ensemble learning for Classification Techniques Based on Majority Voting", 2016 7th IEEE International Conference on Software Engineering and Service Science (ICSESS), Aug. 26-28, 2016, pp. 107-110, ISBN: 978-1-4673-9904-3.

Minh Nguyen Nhat To et al., "Deep regression neural networks for collateral imaging from dynamic susceptibility contrast-enhanced magnetic resonance perfusion in acute ischemic stroke", International Journal of Computer Assisted Radiology and Surgery, Sep. 3, 2019, pp. 151-162, vol. 15.

* cited by examiner

METHOD AND ANALYSIS DEVICE FOR COLLATERAL CIRCULATION ASSESSMENT BASED ON DEEP LEARNING MODEL USING DYNAMIC PERFUSION MRI IMAGE

CROSS-REFERENCE TO PRIOR APPLICATIONS

This application is a National Stage patent Application of PCT International Application No. PCT/KR2022/015553 (filed on Oct. 14, 2022), which claims priority to Korean Patent Application No. 10-2021-0149615 (filed on Nov. 3, 2021), which are all hereby incorporated by reference in their entirety.

BACKGROUND

The following description relates to a collateral circulation assessment technique using perfusion magnetic resonance imaging (MRI).

In patients with acute ischemic stroke, both antegrade flow and retrograde collateral flow maintain cerebral blood flow within an ischemic lesion. Brain magnetic resonance imaging (MRI) is widely used to assess collateral circulation. In addition to general MRI, perfusion MRI may be used to assess collateral circulation.

SUMMARY

The following description provides a technique for automatically assessing collateral circulation using perfusion magnetic resonance imaging (MRI).

In one general aspect, there is provided a method of collateral circulation assessment of a subject using dynamic perfusion magnetic resonance imaging (MRI) images includes receiving, by an analysis device, dynamic perfusion MRI images of a brain of a subject, extracting, by the analysis device, arterial phase images, capillary phase images, and venous phase images from the dynamic perfusion MRI images, inputting, by the analysis device, each of the arterial phase images, the capillary phase images, and the venous phase images into a pre-trained deep learning model to calculate a plurality of collateral circulation prediction probability values, and performing, by the analysis device, a final collateral circulation assessment for the subject using the plurality of collateral circulation prediction probability values.

In another aspect, there is provided an analysis device for collateral circulation assessment of a subject using dynamic perfusion MRI images includes an input device that receives dynamic perfusion MRI images of a brain of a subject, a storage device that stores a deep learning model trained to calculate a collateral circulation state probability value for an input MRI slice, and a calculation device that extracts arterial phase images, capillary phase images, and venous phase images from the dynamic perfusion MRI images, inputs each of the arterial phase images, the capillary phase images, and the venous phase images to the deep learning model to calculate a plurality of collateral circulation prediction probability values, and performs a final collateral circulation assessment for the subject using the plurality of collateral circulation prediction probability values.

The following description can automatically assess collateral circulation using a patient's perfusion MRI using a deep learning model. As a result, the following description is possible to help provide guidance for patient care in emergency situations without the help of a reading expert.

DETAILED DESCRIPTION

Figure 1:
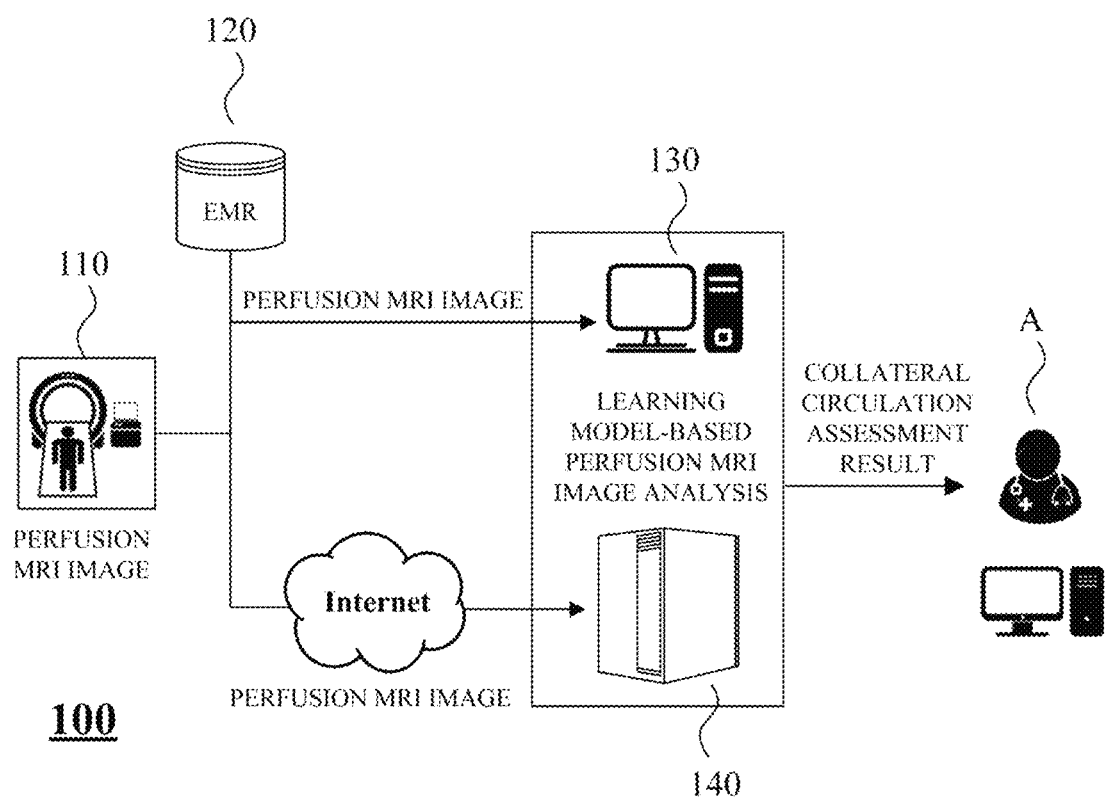
FIG. 1 is an example of a system for collateral circulation assessment using brain magnetic resonance imaging (MRI).

A technology to be described below may be variously modified and have several exemplary embodiments. Therefore, specific exemplary embodiments of the present disclosure will be illustrated in the accompanying drawings and be described in detail. However, it is to be understood that the technologies described below are not limited to a specific embodiment, but include all modifications, equivalents, and substitutions not departing from the scope and spirit of the technologies described below.

Terms such as "first," "second," "A," "B," and the like may be used to describe various components, but the components are not to be interpreted as limited to the terms, which are used only for distinguishing one component from other components. For example, a first component may be named a second component and a second component may also be similarly named a first component without departing from the scope of the technologies described below. The term "and/or" includes a combination of a plurality of related described items or any one of the plurality of related described items.

It should be understood that singular expressions include plural referents unless the context clearly indicates otherwise, and it will be further understood that terms such as "comprise" and "have" used in this specification specify the presence of stated features, steps, operations, components, parts, or a combination thereof, but do not preclude the presence or addition of one or more other features, numerals, steps, operations, components, parts, or a combination thereof.

Prior to the detailed description of the drawings, it is intended to clarify that the components in this specification are only distinguished by their main functions. That is, two or more components to be described below may be combined into one component, or one component may be divided into two or more for each subdivided function. In addition, each of the constituent parts to be described below may additionally perform some or all of the functions of other constituent parts in addition to the main functions of the constituent parts, and some of the main functions of the constituent parts may be performed exclusively by other components.

In addition, in performing the method or the operation method, each of the processes constituting the method may occur differently from the specified order unless a specific order is explicitly described in context. That is, the respective steps may be performed in the same sequence as the described sequence, performed at substantially the same time, or performed in an opposite sequence to the described sequence.

The technique described below is a technique to assess collateral circulation in a brain. The collateral circulation is a phenomenon in which blood flow bypasses a blockage in normal blood flow due to vascular stenosis or occlusion through other blood vessels. Cerebral blood flow is composed of anterior circulation by the bilateral carotid arteries and posterior circulation by the vertebral basilar artery on the back, and the anterior circulation and the posterior circulation anastomose at a base part of a brain to form the circle of Willis, and branch into the anterior cerebral artery, the middle cerebral artery, and the posterior cerebral artery. Each of these blood vessels is ultimately responsible for supplying blood to a certain area of the brain, but anastomoses between these blood vessels are also formed in several places to achieve collateral circulation in the event of a lesion of one blood vessel.

The technology described below uses perfusion magnetic resonance imaging (MRI) images. The perfusion phenomenon involves delivering blood to parenchyma of cells through capillaries. In the perfusion MRI, an exogenous perfusion MRI method obtained by administering a contrast agent through a vein in a human body has been commonly used. In other words, it is a method of continuously obtaining images from a certain body part while tracking a flow of contrast agent over time.

The dynamic perfusion MRI is a technique of continuously obtaining multiple frames of brain images for 1 to 2 minutes with a temporal resolution of 1 to 2 seconds during a first pass of a contrast agent. In the brain images, perfusion-weighted images, which are blood flow images using a signal reduction method, mainly use a dynamic susceptibility contrast (DSC) technique. A DSC image is obtained as a T2*-weighted image since the contrast agent changes T2* by making a difference in surrounding susceptibility large. In the case of brain tissue suffering from ischemia due to blocked cerebral blood vessels, the contrast agent is not supplied well to the tissues, and therefore the MRI image is brighter than that of normal brain tissue during the first pass, and the point at which the MRI signal is minimized is delayed compared to normal brain tissues.

An arterial phase is a phase in which contrast dye staining begins from an insular region of a normal brain parenchyma, a capillary phase is a phase in which the entire brain parenchyma on the normal side is stained with the highest signal intensity, and a venous phase is a phase in which the contrast agent is washed out from the normal brain parenchyma.

Hereinafter, it is described that the analysis device assesses collateral circulation in the dynamic perfusion MRI images using a certain learning model. The analysis device may be implemented as a variety of devices capable of processing data. For example, the analysis device may be implemented as a personal computer (PC), a server on a network, a smart device, or a chipset with a dedicated program embedded therein, etc.

Examples of the learning model include a decision tree, a random forest (RF), a K-nearest neighbor (KNN), a naive Bayes, a support vector machine (SVM), an artificial neural network (ANN), and the like. In particular, the technology described below may assess the collateral circulation in the dynamic perfusion MRI images using an ANN.

An ANN is a statistical learning algorithm that mimics a biological neural network. Various neural network models are being studied. Recently, a deep learning network (DNN) has been attracting attention. A DNN is an ANN model composed of several hidden layers between an input layer and an output layer. Similar to general ANNs, a DNN may model complex non-linear relationships. Various types of DNN models have been studied. Examples of DNNs include a convolutional neural network (CNN), a recurrent neural network (RNN), a restricted Boltzmann machine (RBM), a deep belief network (DBN), a generative adversarial network (GAN), reinforcement learning (RL), and the like.

FIG. 1 is an example of a system 100 for collateral circulation assessment using brain MRI. In FIG. 1, the analysis device illustrates an example of a computer terminal 130 and a server 140.

The MRI equipment 110 generates brain MRI images for a subject. In particular, the MRI equipment 110 may generate perfusion MRI images or dynamic perfusion MRI images for a subject into which the contrast agent is injected. The perfusion MRI images of the subject may be stored in an electronic medical record (EMR) 120.

In FIG. 1, a user A may use the computer terminal 130 to assess the collateral circulation using the perfusion MRI images of the subject. The computer terminal 130 receives the perfusion MRI images of the subject. The computer terminal 130 may receive the perfusion MRI images from the MRI equipment 110 or the EMR 120 through a wired or wireless network. In some cases, the computer terminal 130 may be a device physically connected to the MRI equipment 110.

The computer terminal 130 may consistently preprocess the perfusion MRI images of the subject. The computer terminal 130 may generate arterial phase images, capillary phase images, and venous phase images based on the perfusion MRI images. The computer terminal 130 may input the arterial phase images, the capillary phase images, and the venous phase images to a pre-trained deep learning model to derive the collateral circulation assessment results for the subject. The detailed analysis process will be described below. The user A may check the analysis results.

The server 140 may receive the perfusion MRI images of the subject from the MRI equipment 110 or the EMR 120. The server 140 may consistently process the perfusion MRI images of the subject. The server 140 may generate the arterial phase images, the capillary phase images, and the venous phase images based on the perfusion MRI images. The server 140 may input the arterial phase images, the capillary phase images, and the venous phase images to the pre-trained deep learning model to derive the collateral circulation assessment results for the subject. The detailed analysis process will be described below. The server 140 may transmit the analysis results to the user A's terminal. The user A may check the analysis results.

The computer terminal 130 and/or server 140 may store the analysis results in the EMR 120.

Figure 2:
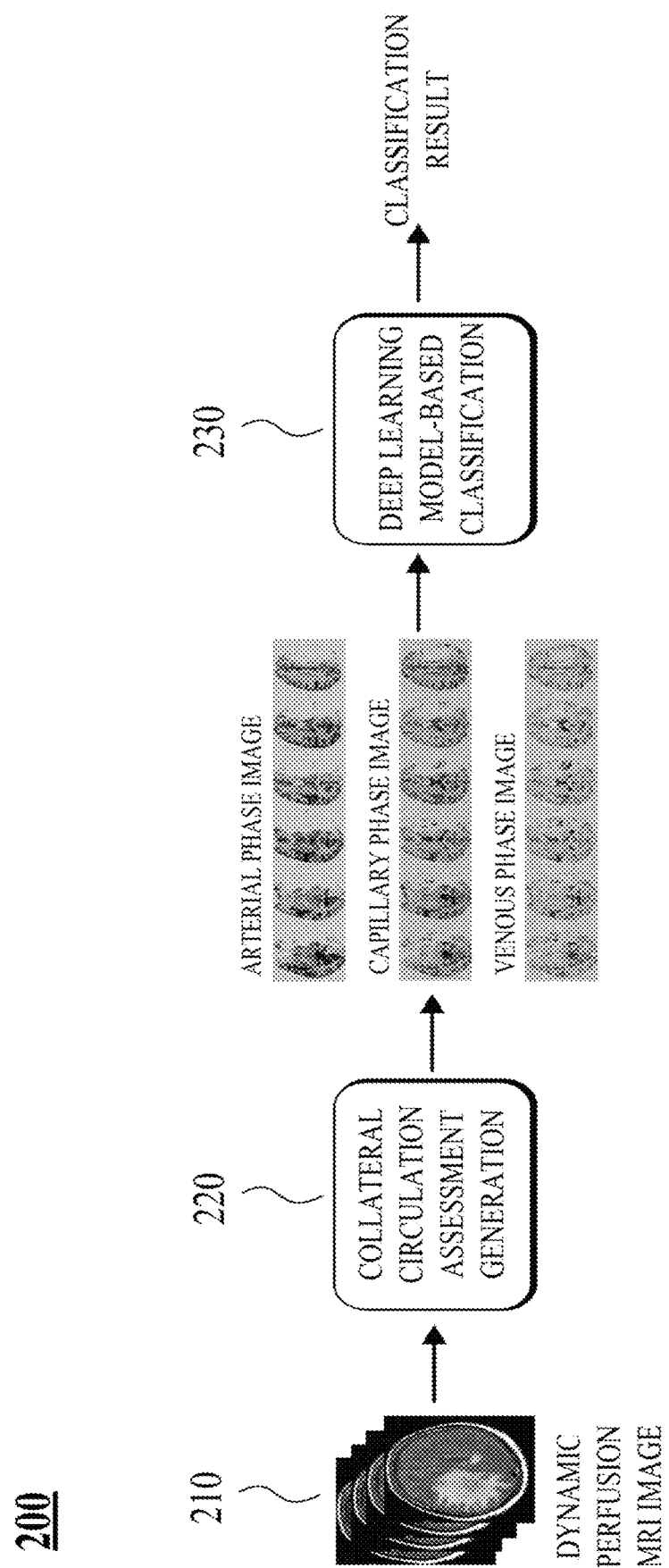
FIG. 2 is an example of a process of collateral circulation assessment using brain MRI.

FIG. 2 is an example of a collateral circulation assessment process 200 using dynamic perfusion MRI.

The analysis device receives the dynamic perfusion MRI images of the brain of the subject (210). Detailed description of the process of acquiring the dynamic perfusion MRI images will be omitted.

The analysis device generates the arterial phase images, the capillary phase images, and the venous phase images using the dynamic perfusion MRI images of the subject (220). The analysis device consistently processes raw data of the dynamic perfusion MRI images to generate the arterial phase images, the capillary phase images, and the venous phase images. The detailed process will be described below.

The analysis device inputs the generated arterial phase images, capillary phase images, and venous phase images to the pre-trained deep learning model to assess the collateral circulation (230). The deep learning model extracts features from the input images and calculates a predicted value (probability value) for the collateral circulation state based on the extracted features.

Meanwhile, the deep learning model may be implemented in various structures. For example, the deep learning model may receive the arterial phase images, the capillary phase images, and the venous phase images through individual input layers, extract features from each image at a separate convolution layer, connect the individual features, and calculate the probability value for the collateral circulation through a fully connected layer. Alternatively, the deep learning model may build individual models for each of the arterial phase images, capillary phase images, and venous phase images, and use the values calculated by each individual model to assess a final collateral circulation state.

Figure 3:
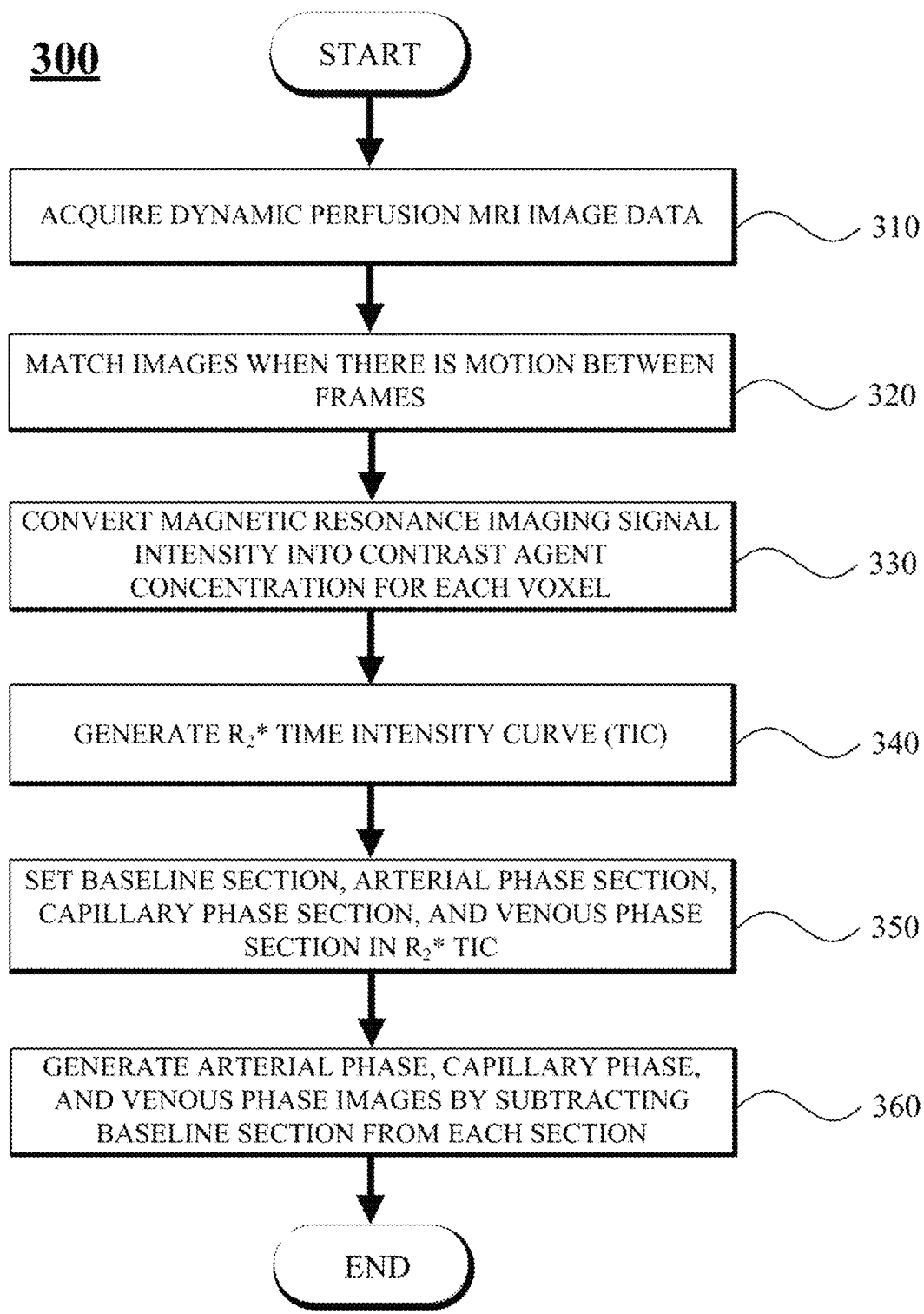
FIG. 3 is an example of a process of generating a collateral image composed of an arterial phase, a capillary phase, and a venous phase using dynamic perfusion MRI.

FIG. 3 is an example of a process 300 of generating a collateral image composed of an arterial phase, a capillary phase, and a venous phase using dynamic perfusion MRI.

The analysis device acquires data of the dynamic perfusion MRI images 310. The dynamic perfusion MRI images may be in the form of a DICOM file. The dynamic perfusion MRI images may be expressed as a four-dimensional array S(x,y,z,t). Here x, y and z are positions in a three-dimensional space, and t refers to time.

When movement of an object occurs between frames, the analysis device may perform image registration to match the positions of the images between the frames (320).

The analysis device converts the MRI signal intensity into the contrast agent concentration for each voxel (330).

The analysis device may perform the following processing in one voxel unit. The analysis device may convert the MRI signal intensity S (t) into contrast agent concentration C(t) for voxels (x, y, z) as shown in Equation 1 below.

$$C(t) = -\frac{1}{r_2 \cdot TE} \cdot \log\left(\frac{S(t)}{S_0}\right) \quad \text{[Equation 1]}$$

Here, $r_2$ denotes a T2 relaxation rate constant, TE denotes an echo time, and $S_0$ denotes an initial value of the MRI signal intensity before the contrast agent injection. The relaxation rate $R_2^*(t)$ is proportional to the contrast agent concentration C(t) and is calculated by putting $R_2^*(t)=kC(t)$ for convenience.

The analysis device generates an $R_2^*$ time intensity curve (TIC) (340). The analysis device may obtain the TIC by calculating the TIC for each time frame t with a value obtained by averaging the contrast agent concentrations for all slices or all voxels of a slice in a region of interest, as shown in Equation 2 below.

$$R_2^*(t) = 1/N \cdot \sum_{x,y,z} R_2^*(x, y, z, t) \quad \text{[Equation 2]}$$

The analysis device sets a baseline section, an arterial phase section, a capillary phase section, and a venous phase section in the generated $R_2^*$ TIC (350).

Figure 4:
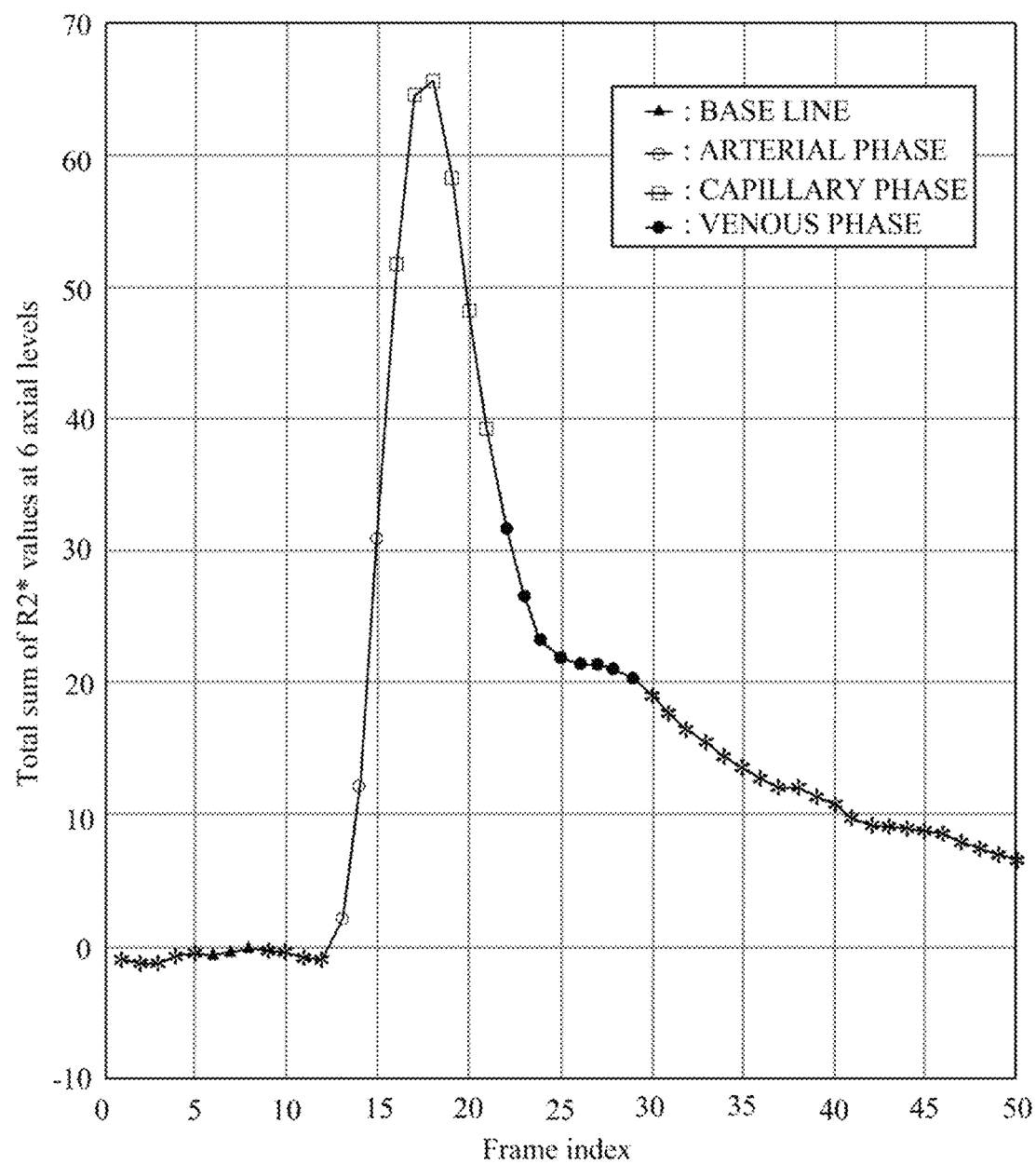
FIG. 4 is an example of an $R_2^*$ time intensity curve (TIC).

This process will be described based on FIG. 4. FIG. 4 is an example of the $R_2^*$ time intensity curve (TIC). In FIG. 4, a horizontal axis denotes a frame index, and a vertical axis denotes an $R_2^*$ sum value in the corresponding frame. The analysis device first determines the frame and baseline section with the highest $R_2^*$ value in the TIC. The analysis device may set a section (lower half section, section within half of the maximum value) from the point where the curve begins after passing the baseline section to half of the maximum value of $R_2^*$ as the arterial phase section. The analysis device may set half (upper half section, section exceeding half of the maximum value) of the maximum value of $R_2^*$ as the capillary phase section in the TIC. The analysis device may set the section after the capillary phase section as the venous phase section.

The analysis device subtracts the baseline image from each of the images of the arterial phase section, the capillary phase section, and the venous phase section to generate the final arterial phase images, capillary phase images, and venous phase images 360. (i) The analysis device calculates the baseline image (frame) by subtracting the baseline image from each of the images (frames) located in the arterial phase section. The images calculated in this process are the arterial phase images. (ii) The analysis device calculates the baseline image (frame) by subtracting the baseline image from each of the images (frames) located in the capillary phase section. The images calculated in this process are the capillary phase images. (iii) The analysis device calculates the baseline image (frame) by subtracting the baseline image from each of the images (frames) located in the venous phase section. The images calculated in this process are the venous phase images. Meanwhile, researchers constituted images for each section with adjacent frames for each section.

Figure 5:
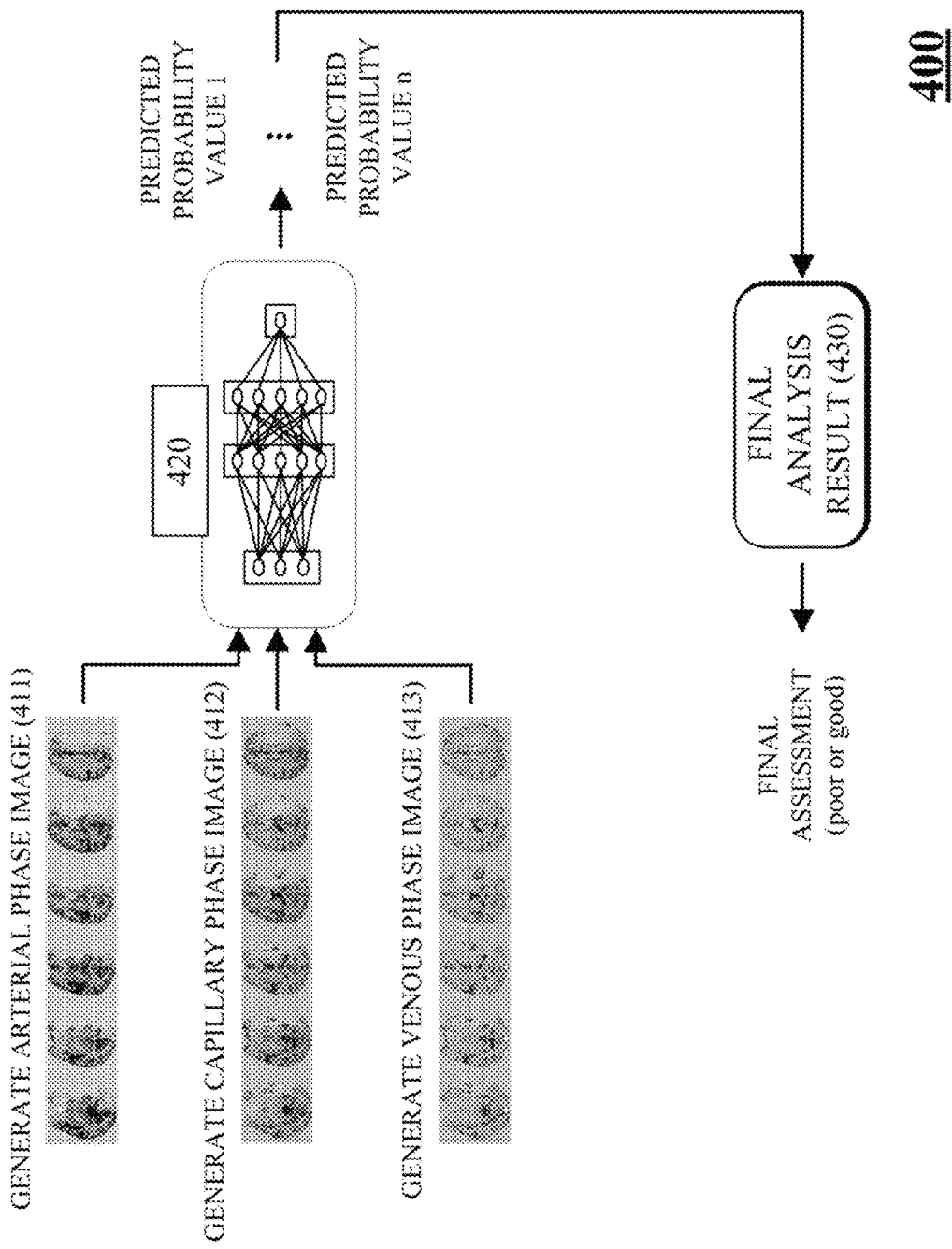
FIG. 5 is an example of a process of performing collateral circulation assessment using a deep learning model.

FIG. 5 is an example of a process 400 of performing collateral circulation assessment using a deep learning model. FIG. 5 is an example of a process of performing collateral circulation assessment using one deep learning model.

The learning process will be described briefly. The training data is as described in Table 1 below. Based on the MRI collateral circulation grade assessed by cerebral infarction clinician experts in four grades for each patient, researchers classified grades 1 and 2 as poor, and grades 3 and 4 as good (label data construction). Researchers prepared training image data by augmenting the training data by constantly rotating the training data.

The analysis device generates the arterial phase images (411), the capillary phase images (412), and the venous phase images (413) through the above-described process. The images of each section are composed of a plurality of slices.

The analysis device sequentially inputs each slice of each section to the trained deep learning model (420). When one slice is input, the deep learning model calculates the probability value of the collateral circulation state for the corresponding slice. For example, when there are n slices, n predicted probability values are calculated. Furthermore, when a k-order verification model is used as designed by researchers, a larger number of predicted probability values (n*k) may be calculated.

The analysis device may determine the final probability value by averaging the generated predicted probability values (430). The analysis device may compare the final probability value and a cutoff value to determine the final analysis result (poor or good).

Hereinafter, the results of an experiment for verifying the performance of the deep learning model performing the collateral circulation assessment described above will be described. Table 1 below provides information on data used in the process (model development) of constructing, by researchers, the deep learning model and data used in the verification process (external validation).

verification data. First, Table 2 shows the postoperative course and the results predicted by the deep learning model for patients who had undergone the successful reperfusion treatment. Modified treatment in cerebral infarction (mTICI)

TABLE 1

|  | Model development (n = 255) | | | External validation (n = 72) | | |
|---|---|---|---|---|---|---|
|  | MRP collateral grade | | | MRP collateral grade | | |
|  | Poor (n = 70) | Good (n = 185) | p-value | Poor (n = 28) | Good (n = 44) | p-value |
| Age (year) | 69 (59-75) | 69 (55-77) | 0.99 | 69 (61-80) | 68 (61-78) | 0.45 |
| Men | 34 (49%) | 104 (56%) | 0.28 | 16 (57%) | 24 (55%) | 0.83 |
| NIHSS baseline | 18 (16-20) | 14 (10-18) | <0.01 | 17 (13-18) | 13 (9-17) | 0.02 |
| Onset to MRI time (min) | 131 (90-232) | 144 (97-231) | 0.71 | 106 (88-145) | 131 (91-236) | 0.48 |
| Risk factors | | | | | | |
| Atrial fibrillation | 33 (47%) | 67 (36%) | 0.12 | 11 (39%) | 21 (48%) | 0.49 |
| Hypertension | 43 (61%) | 107 (58%) | 0.60 | 21 (75%) | 30 (68%) | 0.54 |
| Diabetes mellitus | 20 (29%) | 51 (28%) | 0.87 | 9 (32%) | 9 (20%) | 0.29 |
| Dyslipidemia | 13 (19%) | 61 (33%) | 0.01 | 15 (54%) | 21 (48%) | 0.64 |
| Current smoking | 11 (16%) | 31 (18%) | 0.61 | 5 (18%) | 10 (23%) | 0.62 |
| Stroke mechanism | | | | | | |
| Large artery disease | 10 (14%) | 58 (31%) | <0.01 | 5 (18%) | 10 (22%) | 0.62 |
| Cardioembolic stroke | 42 (60%) | 94 (51%) | 0.19 | 18 (64%) | 29 (66%) | 0.89 |
| Other determined stroke | 10 (14%) | 22 (12%) | 0.62 | 0 (0%) | 4 (9%) | — |
| Undetermined stroke | 8 (11%) | 11 (6%) | 0.20 | 5 (18%) | 1 (2%) | 0.05 |
| Mode of treatment | | | | | | |
| No reperfusion therapy | 17 (24%) | 35 (19%) | 0.19 | 2 (7%) | 5 (11%) | 0.54 |
| IV tPA only | 6 (9%) | 9 (5%) | 0.32 | 2 (7%) | 4 (9%) | 0.77 |
| EVT ± IV tPA | 47 (67%) | 141 (76%) | 0.16 | 24 (86%) | 35 (80%) | 0.50 |
| Cath angio collateral grade distribution (0-1/2/3/4)* | 33/12/6/0 | 28/23/71/30 | <0.001 | 8/12/1/0 | 1/6/15/3 | <0.001 |

The researchers used data about 327 patients. The researchers used data about 255 patients as training data to construct the model, and used data about 72 patients as validation data. Table 1 lists clinical information for patients belonging to the poor and good groups. The external validation data includes diffusion-weighted imaging (DWI) and dynamic susceptibility contrast magnetic resonance perfusion (DSC-MRP) scan data before and 7 days after treatment in patients who had undergone successful reperfusion (treatment for cerebral infarction).

The researchers used a CNN model implemented in Keras. The CNN model used was composed of four convolutional layers (each layer including a Relu activation function and a max pooling layer) and two fully connected layers. The deep learning model output binary classification results for poor or good.

The researchers trained the model in the form of fivefold cross-validation. The researchers determined the predicted probability value for the input image as the average of the values calculated by the five models. The researchers derived the cutoff value for the collateral circulation assessment from receiver operating characteristic (ROC) curve analysis.

As a result of external verification, in the deep learning model, an area under the curve (AUC) for good collateral circulation reached 0.85. By using the optimal cutoff value, the statistical analysis results of the consistency between the reader's manual reading results and the results predicted by the deep learning model resulted in a kappa value of 0.53 (95% CI, 0.32-0.73, p<0.0001). Therefore, the performance of the deep learning model performing the collateral circulation assessment was shown to be quite high.

Table 2 below shows the results of assessing the performance of the deep learning model (DL) using the above scores the degree of reperfused area, and a score of 2b or higher means that more than 50% of the existing vascular occlusion area was successfully reperfused. Looking at Table 2, it can be seen that the average infarct growth of patients classified as poor by the deep learning model 7 days after undergoing reperfusion treatment was much larger than that of patients classified as good.

TABLE 2

| Group | MR collateral grade | mRS 0-2 at 90 days n (%) | Infarct growth volume (mL) median [IQR] |
|---|---|---|---|
| mTICI 2b-3 | Good | 16 (69) | 6 [1-12.5] |
|  | Poor | 15 (60) | 26 [8-74] |
|  | p-value | 0.50 | 0.001 |
| mTICI 0-2a or no EVT | Good | 7 (39) | 50 [9-74.5] |
|  | Poor | 1 (17) | 59 [6-141] |
|  | p-value | 0.30 | 0.50 |

Meanwhile, among the patients included in the validation data, patients with a modified Rankin Scale (mRS) of 0 to 2a for 90 days or patients who did not undergo endovascular therapy (EVT) did not show significant differences in average infarct extension regardless of the results classified by the deep learning model.

Figure 6:
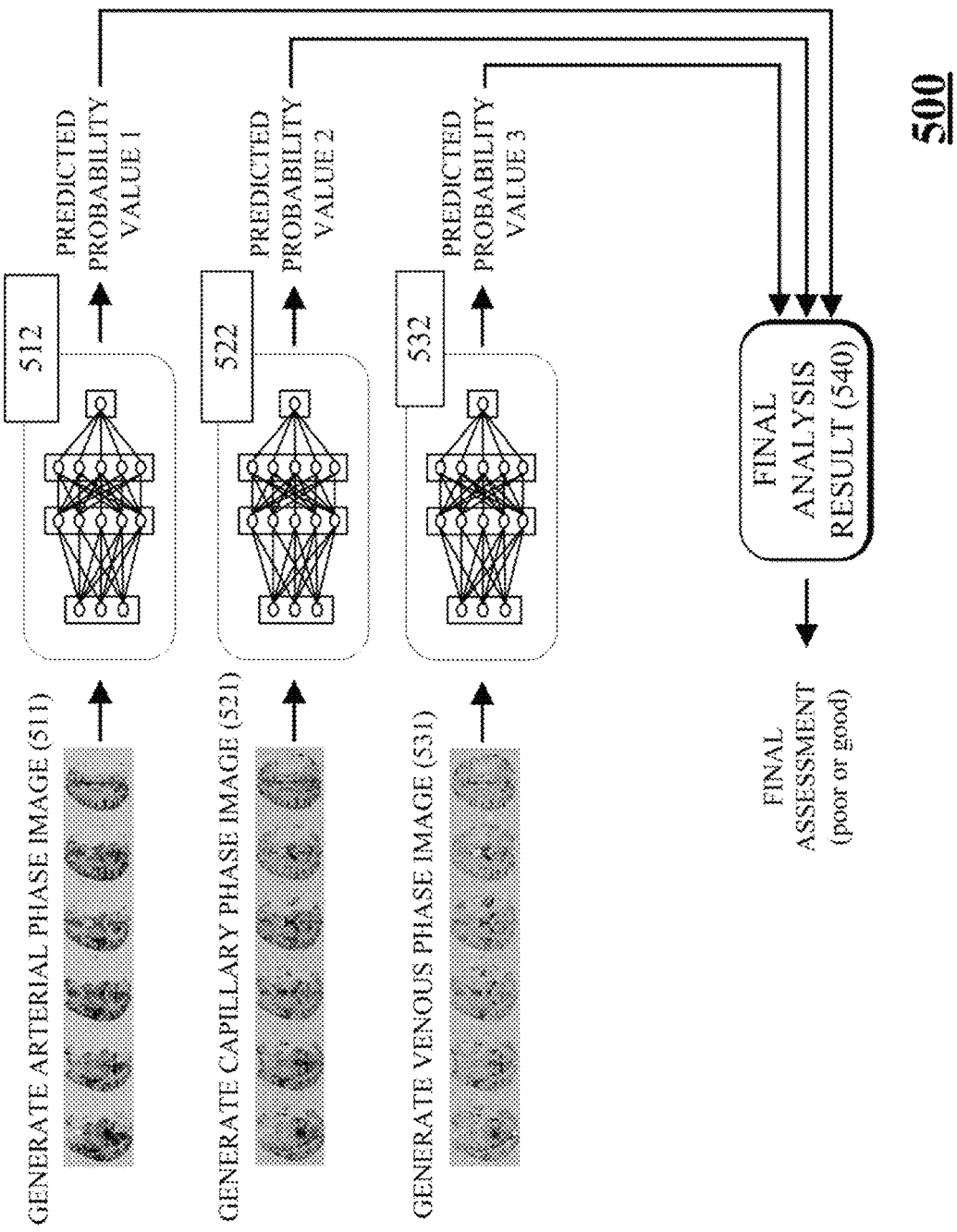
FIG. 6 is another example of a process of performing collateral circulation assessment using a deep learning model.

FIG. 6 is another example of a process 600 of performing collateral circulation assessment using a deep learning model. FIG. 6 is an example of an ensemble model. Therefore, FIG. 6 is an example of using individual models (three models) for each image type.

In the case of the ensemble model, each model should be trained to predict the collateral circulation state using different types of training data (arterial phase images, capillary phase images, and venous phase images).

The analysis device generates the arterial phase images through the above-described process (511), and inputs the generated arterial phase images to a first model to calculate a predicted probability value of 1 (512). In this case, when the arterial phase images are composed of a plurality of slices, the analysis device may input the individual slices sequentially and determine the calculated summed average value as the predicted probability value of 1.

The analysis device generates the capillary phase images through the above-described process (521), and inputs the generated capillary phase images to a second model to calculate a predicted probability value of 2 (522). In this case, when the capillary phase images are composed of a plurality of slices, the analysis device may input the individual slices sequentially and determine the calculated summed average value as the predicted probability value of 2.

The analysis device generates the venous phase images through the above-described process (531), and inputs the generated venous phase images to a third model to calculate a predicted probability value of 3 (532). In this case, when the venous phase images are composed of a plurality of slices, the analysis device may input the individual slices sequentially and determine the calculated summed average value as the predicted probability value of 3.

The analysis device may determine the final probability value by averaging the generated predicted probability values (540). The analysis device may compare the final probability value and a cutoff value to determine the final analysis result (poor or good).

Figure 7:
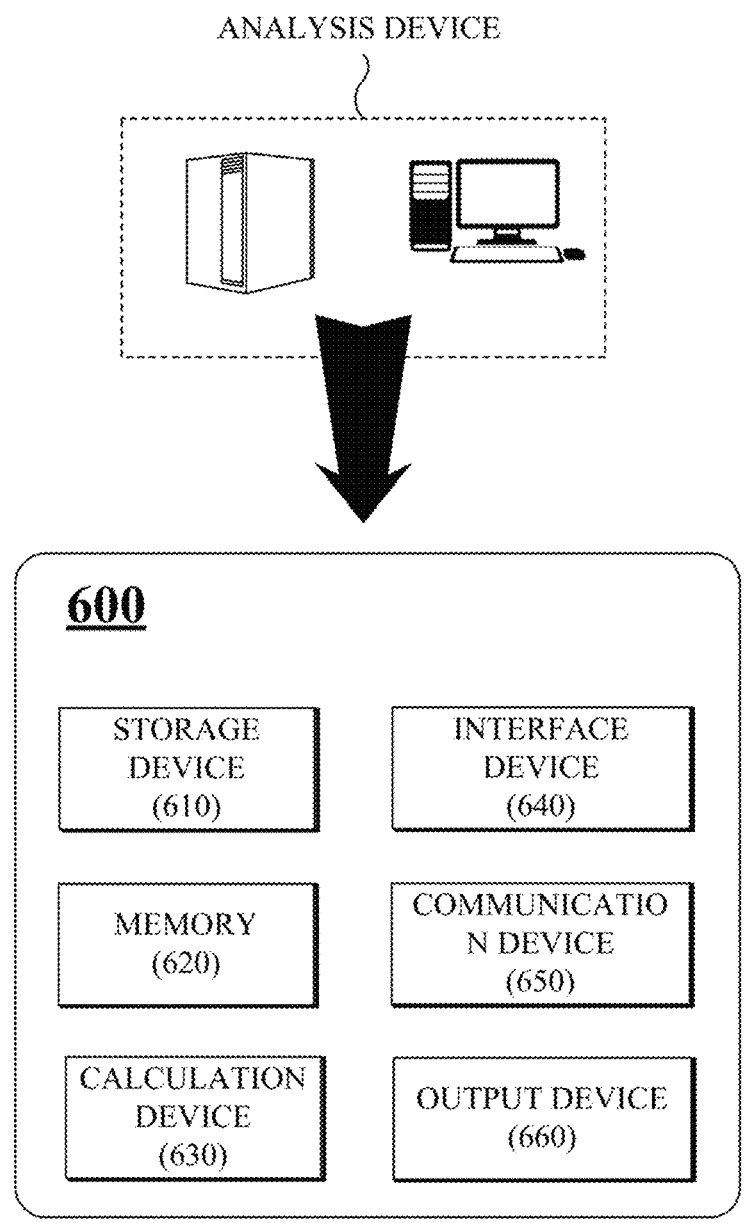
FIG. 7 is an example of an analysis device for performing collateral circulation assessment using dynamic perfusion MRI.

FIG. 7 is an example of an analysis device 600 for performing collateral circulation assessment using dynamic perfusion MRI. The analysis device 600 corresponds to the above-described analysis device (130 and 140 in FIG. 1). The analysis device 600 may be physically implemented in various forms. For example, the analysis device 600 may have the form of a computer device such as a PC, a server of a network, a data processing-only chipset, or the like.

The analysis device 600 may include a storage device 610, a memory 620, a calculation device 630, an interface device 640, a communication device 650, and an output device 660.

The storage device 610 may store the deep learning model that predicts the above-described collateral circulation state.

The storage device 610 may store the dynamic perfusion MRI images of the subject.

The storage device 610 may store a program or code that processes the dynamic perfusion MRI images of the subject to generate the arterial phase images, the capillary phase images, and the venous phase images.

The storage device 610 may store the arterial phase images, the capillary phase images, and the venous phase images generated from the dynamic perfusion MRI images of the subject. Each image may be composed of a plurality of slices.

The storage device 610 may store analysis results (image, classification results).

The memory 620 may store data, information, and the like generated in the process of, by the analysis device 600, processing the dynamic perfusion MRI images, performing the collateral circulation assessment using the deep learning model, etc.

The interface device 640 is a device that receives predetermined commands and data from the outside. The interface device 640 may receive the dynamic perfusion MRI images to be analyzed from a physically connected input device or an external storage device. The interface device 640 may transmit analysis results (image, text, etc.) to an external object.

The communication device 650 is a configuration for receiving and transmitting predetermined information through a wired or wireless network. The communication device 650 may receive the dynamic perfusion MRI images to be analyzed from the external object. Alternatively, the communication device 650 may transmit the analysis results (image, text, etc.) to an external object such as a user terminal.

The interface device 640 and the communication device 650 are configured to transmit and receive certain data from a user or other physical object, and therefore, may also be collectively referred to as input/output devices. When limited to the function of receiving the dynamic perfusion MRI images, the interface device 640 and the communication device 650 may be referred to as input devices.

The output device 660 is a device that outputs predetermined information. The output device 660 may output an interface necessary for a data processing process, an analysis result, and the like.

The calculation device 630 may receive the dynamic perfusion MRI images using the commands or program codes stored in the storage device 610 and evaluate the collateral circulation of the subject.

The calculation device 630 may generate the arterial phase images, the capillary phase images, and the venous phase images from the dynamic perfusion MRI images using the above-described process and corresponding program.

The calculation device 630 inputs slices of the arterial phase images, the capillary phase images, and the venous phase images to the deep learning model using the above-described process and corresponding program to calculate the predicted probability value of the collateral circulation assessment for the corresponding image or slice.

The calculation device 630 may determine the final predicted probability value using the predicted probability values for the plurality of slices, as in the process described in FIG. 5 or 6.

In addition, the calculation device 630 may compare the final predicted probability value and the cutoff value to determine the collateral circulation assessment result (good or poor state) of the subject.

The calculation device 630 may be a device such as a processor, an application processor, or a chip in which a program that processes data and processes a predetermined operation is embedded.

In addition, the method of processing dynamic perfusion MRI images and the method of collateral circulation assessment described above may be implemented as a program (or application) including an executable algorithm that may be executed on a computer. The program may be stored and provided in a non-transitory computer readable medium.

The non-transitory computer-readable medium is not a medium that stores data therein for a while, such as a register, a cache, a memory, or the like, but a medium that semi-permanently stores data therein and is readable by a device. Specifically, various applications or programs described above may be provided by being stored in non-transitory readable media such as a compact disc (CD), a digital video disc (DVD), a hard disk, a Blu-ray disc, a Universal Serial Bus (USB), a memory card, a read-only memory (ROM), a programmable read only memory (PROM), an erasable PROM (EPROM), an electrically erasable PROM (EEPROM), or a flash memory.

The transitory readable media are of various RAMs such as a static RAM (SRAM), a dynamic RAM (DRAM), a synchronous DRAM (SDRAM), a double data rate SDRAM (DDR SDRAM), an enhanced SDRAM (ESDRAM), a synclink DRAM (SLDRAM), and a direct rambus RAM (DRRAM).

The present embodiment and the drawings attached to the present specification only clearly show some of the technical ideas included in the above-described technology, and therefore, it will be apparent that all modifications and specific embodiments that can be easily inferred by those skilled in the art within the scope of the technical spirit included in the specification and drawings of the above-described technology are included in the scope of the above-described technology.

The invention claimed is:

1. A method of collateral circulation assessment of a subject using dynamic perfusion magnetic resonance imaging (MRI) images, the method comprising:
   receiving, by an analysis device, dynamic perfusion MRI images of a brain of a subject;
   extracting, by the analysis device, arterial phase images, capillary phase images, and venous phase images from the dynamic perfusion MRI images;
   inputting, by the analysis device, each of the arterial phase images, the capillary phase images, and the venous phase images into a pre-trained deep learning model to calculate a plurality of collateral circulation prediction probability values; and
   performing, by the analysis device, a final collateral circulation assessment for the subject using the plurality of collateral circulation prediction probability values,
   wherein the extracting of the arterial phase images, the capillary phase images, and the venous phase images includes:
      converting, by the analysis device, MRI signal intensity of the dynamic perfusion MRI images into a contrast agent concentration for each voxel;
      calculating, by the analysis device, an R2* time intensity curve as an average value of contrast agent concentration for voxels in some slices or all slices in the dynamic perfusion MRI images;
      setting, by the analysis device, a baseline section, an arterial phase section, a capillary phase section, and a venous phase section in the R2* time intensity curve; and
      subtracting, by the analysis device, a baseline image from each of the slices located in the arterial phase section, the capillary phase section, and the venous phase section to generate the arterial phase images, the capillary phase images, and the venous phase images.

2. The method of claim 1, wherein the analysis device sets a section with a value within half of a maximum value in the $R_2$* time intensity curve as the arterial phase section at an end of the baseline section, sets a section with a value exceeding half of the maximum value as the capillary phase section at an end of the arterial phase section, and sets a section continuing from an end of the capillary phase section as the venous phase section.

3. The method of claim 1, wherein the analysis device performs the collateral circulation assessment by comparing an average value of the plurality of collateral circulation prediction probability values with a threshold value.

4. An analysis device for collateral circulation assessment of a subject using dynamic perfusion magnetic resonance imaging (MRI) images, the analysis device comprising:
   an input device that receives dynamic perfusion MRI images of a brain of a subject;
   a storage device that stores a deep learning model trained to calculate a collateral circulation state probability value for an input MRI slice; and
   a calculation device that extracts arterial phase images, capillary phase images, and venous phase images from the dynamic perfusion MRI images, inputs each of the arterial phase images, the capillary phase images, and the venous phase images to the deep learning model to calculate a plurality of collateral circulation prediction probability values, and performs a final collateral circulation assessment for the subject using the plurality of collateral circulation prediction probability values,
   wherein the calculation device converts MRI signal intensity of the dynamic perfusion MRI images into a contrast agent concentration for each voxel, calculates an R2* time intensity curve as an average value of the contrast agent concentration for voxels in some slices or all slices in the dynamic perfusion MRI images having the contrast agent concentration, sets a baseline section, an arterial phase section, a capillary phase section, and a venous phase section in the R2* time intensity curve, and subtracts a baseline image from each of the slices located in the arterial phase section, the capillary phase section, and the venous phase section to generate the arterial phase images, the capillary phase images, and the venous phase images.

5. The analysis device of claim 4, wherein the calculation device sets a section having a value within half of a maximum value in the $R_2$* time intensity curve at an end of the baseline section as the arterial phase section, and sets a section having a value within half of a maximum value at an end of the arterial phase section as the capillary phase section, and sets a section continuing from an end of the capillary phase section as the venous phase section.

6. The analysis device of claim 4, wherein the calculation device performs the collateral circulation assessment by comparing an average value of the plurality of collateral circulation prediction probability values with a threshold value.

* * * * *